July 26, 1932.  W. K. NELSON  1,868,671
METHOD OF AND APPARATUS FOR MAKING GYPSUM BOARD
Filed June 4, 1931
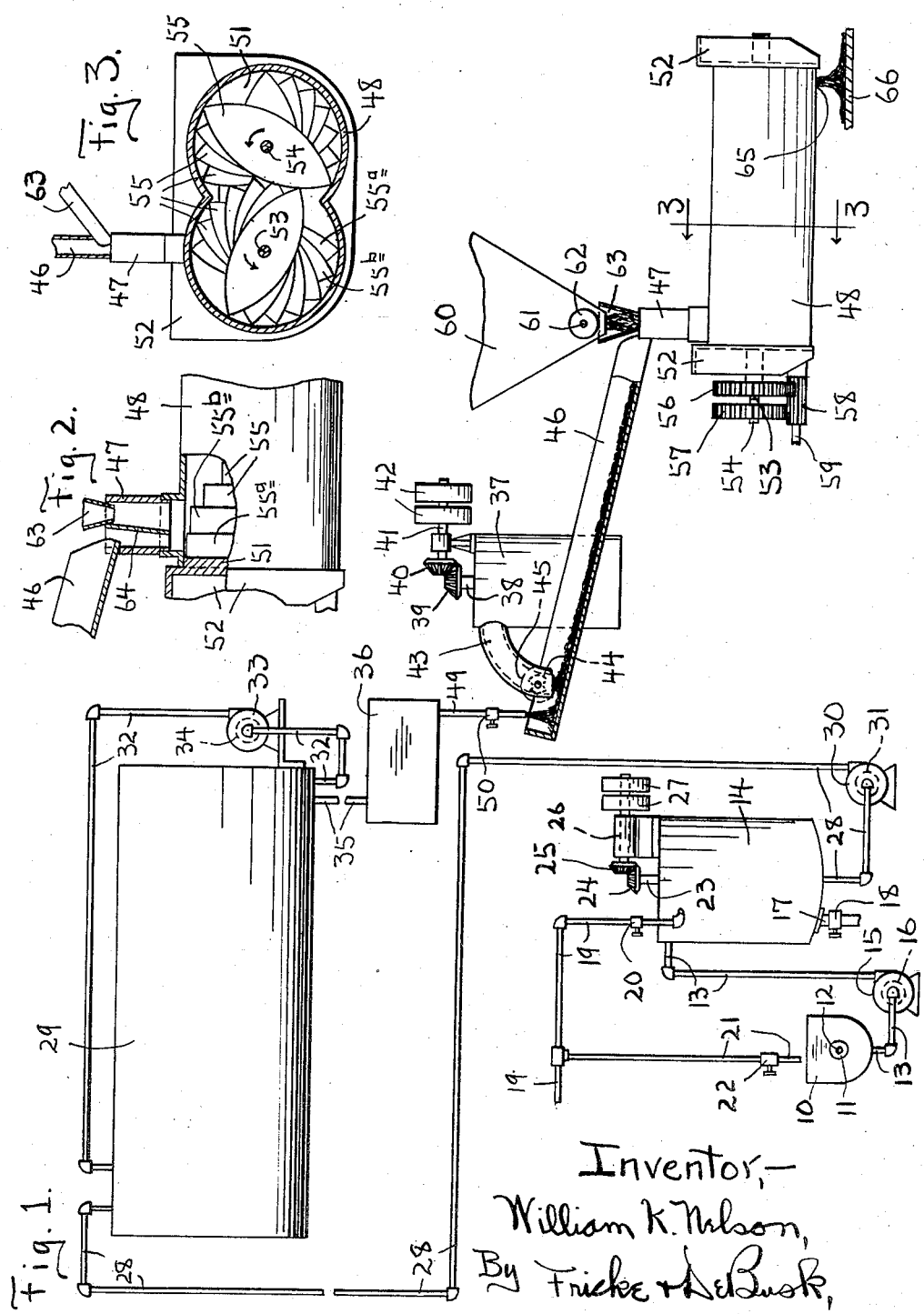

Patented July 26, 1932

1,868,671

UNITED STATES PATENT OFFICE

WILLIAM K. NELSON, OF CHICAGO, ILLINOIS, ASSIGNOR TO UNIVERSAL GYPSUM & LIME CO., OF CHICAGO, ILLINOIS, A CORPORATION OF DELAWARE

METHOD OF AND APPARATUS FOR MAKING GYPSUM BOARD

Application filed June 4, 1931. Serial No. 542,083.

My invention relates to a new and improved method of making a product of the gypsum wall board type, and to an improved apparatus by which such product is produced. It is important to keep down the weight of such board, from the standpoint of both cost of shipment and ease of handling. It is important also to keep down the cost of manufacture, to provide a high degree of strength of the board, and to maintain as completely as possible uniformity of product.

It has been proposed heretofore to employ a quantity of cooked starch or similar carbohydrate in connection with the calcined gypsum incorporated into the body of the board for providing a suspension medium in which the particles of gypsum are supported in a uniform mixture, whereby a considerable quantity of excess water might be used over and above that amount necessary for the crystallization of the gypsum and for gauging for proper consistency, with the result that when the excess water was evaporated after the setting of the gypsum there would be a great multiplicity of minute voids in the body of the board which had originally been occupied by the excess water, to a sufficient extent that the weight of the dried board would be materially reduced. By the use of this expedient, it has been possible to produce finished gypsum wall board three-eighths of an inch thick having a weight of 1400 to 1600 pounds per thousand square feet as compared with a weight of 1800 to 2200 pounds per thousand square feet for the older board having sawdust in its core. By this cooked starch process also the adhesion of the paper liners to opposite faces of the body of the board was materially improved, due partly to the fact that a uniformity of mix of the body materials was much better preserved without any substantial settling of the gypsum up to the time of setting of the gypsum, and partly to the fact that the cooked starch itself has marked adhesiveness.

Another well-known method for producing light weight board involves the use of a foam prepared separately and independently of the gypsum and mixed into the plastic body material before it is introduced between the paper liners. By the use of this expedient, the entrapped air in the foam bubbles incorporated bodily into the mixture, serves necessarily by its presence to lighten the weight of the board.

In the trade, the chief objection to the cooked starch suspension expedient has been the comparatively high cost of the starch and the added expense incidental to the necessity for evaporating the excess water. The increased expenses of drying the board is substantial, it being necessary to employ considerably greater kiln capacity for a given plant in which a substantial excess of water is employed than the kiln capacity necessary for a plant where the amount of water employed is limited to that necessary in the mixture for the crystallization of the gypsum and for the proper gauging of the mixture.

One objection to the foam process as heretofore practiced resides in the difficulty of obtaining a uniform mixture of the foam throughout the body material, there having been a tendency for the formation of slugs of foam so as to produce blisters in the finished product; another objectionable feature is the lack of uniform adhesion of the liners to the body of the board, together with the resulting inferior strength of the board.

My invention aims to produce an improved product wherein cooked starch, or other equivalent carbohydrate material, is used in combination with foam. It is one of the objects of my invention to provide a new and improved method of and apparatus for producing the improved product. To this end, it has been one of my objects to provide an improved method of introducing the desired quantities of foam into a mixer with the other ingredients to be incorporated into the body of the board. It is another object of my invention to provide an improved method of bringing together the several ingredients of the core mixture including pre-formed foam and calcined gypsum whereby the foam is kept largely out of contact with the dry gypsum, being mixed with the gypsum principally in the presence of an ample supply of water so as to avoid any tendency of the gypsum to absorb moisture from the bubbles and thus break up the foam.

A further object of my invention is to provide a new and improved method of mixing pre-formed foam with the other ingredients making up the body of the board whereby greatly increased uniformity is secured in the mixture thereby avoiding the formation of blisters or slugs of foam in the body of the board and particularly the formation of such blisters next to the paper liners. Inasmuch as the presence of blisters materially affects the adhesion of the liners to the body of the board, it will be appreciated that any measure by which the formation of such blisters is prevented is of importance.

It is another object of my invention to provide an improved method of mixing the foam with the other ingredients forming the core mixture whereby the effectiveness of the mixing may be increased without destroying the individual bubbles of the foam to any marked extent.

A further object of my invention is to improve the formation and treatment of the cooked starch solution which is preferably used as an ingredient in my improved board, whereby the solution as fed to the mixer may be kept more uniform.

It is another object of my invention to improve methods of and apparatus for forming products of the gypsum board type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,—

Fig. 1 is a diagrammatic side view of my improved apparatus by which the mixture for the body of my improved wall board is prepared and fed to a wall board machine;

Fig. 2 is a side view, partly in section, and also diagrammatic, showing a portion of the mixer at one end; and Fig. 3 is a vertical cross section through the mixer taken at line 3—3 of Fig. 1.

Referring now to the several figures of the drawing, 10 indicates a small mixer of any approved type adapted to be operated by means of a driving pulley 11 upon a horizontally disposed shaft 12. The bottom portion of the mixer 10 is connected by means of a line of piping 13 with a steam jacketed kettle 14, a pump 15 of any suitable type being interposed in the line of piping 13 for transferring the contents of the mixer 10 to the kettle 14, the pump 15 being preferably driven by means of a driving pulley 16.

The kettle 14 is of any approved type, adapted to receive steam from any suitable source through an inlet pipe 17 controlled by a valve 18. Water is fed to the kettle 14 through a line of piping 19 controlled by a valve 20, the line of piping 19 being also connected with the mixer 10 by means of a pipe 21 controlled by a valve 22. The kettle 14 is also provided with agitating means of any approved type driven by a shaft 23 which in turn is driven through the medium of beveled gears 24 and 25 by a horizontally disposed shaft 26 provided with driving pulleys 27.

The lower end portion of the kettle 14 is connected by a line of piping 28 with a large storage tank 29 mounted in elevated position with respect to the kettle 14, a pump 30 of any suitable type being interposed in said line of piping for transferring the contents of the kettle 14 to the tank 29, the pump 30 being driven by a driving pulley 31.

In the construction shown, a line of piping 32 is connected with the tank 29 at one end at the bottom of the tank and connected at its opposite end with the other end of the tank 29 at the top, such line of piping 32 having a pump 33 of any suitable type interposed therein. The pump 33 is preferably driven by a driving pulley 34 from any suitable source of power. By the operation of the pump 33, a stream of the contents of the tank 29 is kept constantly in circulation through the pipe 32, serving to agitate the whole contents of the tank more or less for keeping it of a uniform consistency.

In the arrangement illustrated, the tank 29 is connected at its bottom by means of a pipe 35 with a smaller tank 36 which is preferably provided with float controlled mechanism of any approved type for maintaining a supply of fluid from the tank 29 at a fixed level in said tank 36.

For supplying the desired supply of foam for the production of my improved board, I have provided a cell or foam producing machine 37 which comprises a receptacle containing suitable beating means operated by a vertical shaft 38 which in the form shown is driven by beveled gears 39 and 40 from a horizontal shaft 41, which in turn is driven by means of driving pulleys 42 adapted to be connected with any suitable source of power. At one side, the cell 37 is provided at its top with a downwardly curved duct 43 through which foam is to be delivered as hereinafter described, the escape of the foam from the duct 43 being controlled through the medium of a fluted roller 44 which is driven from any suitable source of power by a driving pulley 45.

As is clearly shown in Fig. 1, the lower end of the spout or duct 43 of the cell 37 empties into one end of an inclined trough 46 which leads to a feed hopper 47 at the top of a mixer 48 at one end thereof. A pipe 49 leading from the tank 36 also empties into the end of the trough 46 adjacent to the duct 43, such pipe 49 being provided with a control valve 50.

The mixer 48 comprises an elongated roller 44, and with the rate of deposit of such receptacle in the form illustrated being made of sheet metal secured at the ends of the receptacle about heads 51 on the inner faces of end castings 52. Two shafts 53 and 54 are revolubly mounted in suitable bearings on the end castings 52 in parallel relation to each other, being equipped with mixer paddles 55 fixedly mounted on the shafts and so shaped and arranged that when the shafts are revolved at the same speed and in the same direction each paddle on one shaft has its entire edge face scraped clean by a cooperating paddle on the other shaft. The wall of the mixer is also so arranged that its entire inner face opposite the series of paddles 55 is scraped clean at each complete rotation of said shafts. As is best shown in Fig. 3, the paddles 55 are arranged in progressively varied angular position so as to have a tendency upon rotation in counter-clockwise direction in Fig. 3 to forward the contents of the mixer toward the right in Fig. 1.

The rotation of the shafts 53 and 54 is effected through the medium of gears 56 and 57 mounted on said shafts respectively, meshing with a wide pinion 58 carried by a short drive shaft 59.

Above the mixer 48 I have provided a container 60 adapted to hold a quantity of finely powdered calcined gypsum, and terminating at its lower end in a discharge hopper and provided with mechanism driven by a shaft 61 and pulley 62 for feeding the gypsum in measured quantities therefrom. Below this container 60, I have provided a conduit or trough 63 which leads to the feed hopper 47 of the mixer. As is best shown in Fig. 2, the feed hopper 47 is provided with a baffle plate 64 therein adapted to direct the material from the trough 46 onto the paddle 55a at the left end of the series of paddles 55. The material from the trough 63 is directed by the baffle plate into position on top of the paddle 55b.

At the opposite end of the mixer, the material escapes at a discharge opening, as at 65, upon a paper liner carried by the belt 66 of a board machine, only a fragmentary portion of such belt being shown.

In the use of the mechanism as above described, I have had highly satisfactory results in carrying out my improved method of making wall board by the following procedure. In the mixer 10 I have placed a quantity of starch and cold water in the proportion of one part of starch to three parts of water by weight. The agitating means of the mixer 10 are then operated until the starch and water have been thoroughly mixed, after which the pump 15 is set in operation for transferring the mixture to the kettle 14. Water is then admitted into the tank 14 to bring the contents to the proportions of about 1000 gallons of water to 50 pounds of starch. The water and starch mixture are then agitated in the kettle 14 by means of power applied through the driving pulleys 27, with a suitable quantity of steam present in the kettle for bringing the entire mixture to or approximately to the boiling point, serving thus thoroughly to cook the starch and to burst the granules so as to produce a thin starchy solution. When the cooking of the starch has been completed, the solution is transferred from the kettle 14 to the storage tank 29 through the medium of the pump 30.

During the operation of the apparatus for the production of wall board, the pump 33 is preferably kept in operation for keeping the contents of the storage tank constantly agitated so as to maintain uniformity of the contents of the tank. The smaller tank 36 is, of course, automatically kept filled to the desired predetermined level as above described. By a proper regulation of the valve 50, a stream of the starch solution is kept constantly running from the tank 36 into the upper end of the trough 46.

The materials to be employed in the cell 37 for the production of foam therein may be of any approved type. I prefer, however, to employ a foam solution made up from 52.5 pounds of casein, 3 pounds of potassium hydroxide, and 15 pounds of rosin soap paste agitated in a concentrator with about 200 gallons of water and then diluted to a total volume of 540 gallons. With a proper supply of such foam solution in the cell 37 which is driven constantly by the driving pulleys 42, a foam is produced by a whipping process so as to rise within the cell 37 and descend through the spout 43, the escape of the foam through the spout being controlled by the rotation of the fluted feed roller 44 which is driven in proper timed relation for insuring the feed of the desired amount of the foam.

In the manufacture of board in accordance with my preferred method, I employ for each thousand square feet of board approximately 1100 to 1250 pounds of calcined gypsum; from 2 to 6 pounds of a powdered starch adhesive such as the product which is known to the trade as K. B. paste, which paste may be fed into the mixer 48 in any suitable manner, either separately or with the calcined gypsum or with the cooked carbohydrate solution; 1 to 2½ gallons of a foam solution such as that above suggested; and enough of the cooked carbohydrate solution from the tank 29 to bring the mixture to the desired consistency. It will be understood, of course, that the amounts of the various ingredients fed into the mixer 48 will be regulated by the control devices comprising the valve 50 and the driving pulleys 45 and 62 in such a way as to secure the desired results, the rate of feed depending, of course, upon the speed at which the board machine is being operated.

With the foam being delivered from the cell 37 in measured quantities by the fluted roller 44, and with the rate of deposit of such measured quantities controlled by the speed of rotation of the driving pulley 45, it will be understood that the feed of the foam into the trough 46 is capable of ready control so as to be kept uniform during the operation of the board machine. In the arrangement illustrated, the foam delivered through the spout 43 is carried or floated down the trough 46 by the thin starchy solution escaping from the lower end of the pipe 49 so as to insure uniform feeding of the foam into the mixer 48.

With the shafts 53 and 54 rotating in counter-clockwise direction in Fig. 3 so as to cause the ends of the paddles 55 to dip into the liquid and foam at the bottom of the mixer as they are revolved about the shafts, the powdered gypsum from the trough 63 is caused to fall on top of the wet paddles to the right of the end paddle 55a (see Fig. 2) by which it is carried sidewise in one plane and at the same time is moistened. At the same time the foam and starch liquor from the trough 46 fall onto the end paddle 55a, where they are also given an initial transverse movement, but in a different plane. In this way the foam is kept out of contact with the dry gypsum at the top of the mixer, being brought into contact with the moistened gypsum either at or near the bottom of the mixer in the presence of an abundant supply of moisture. In this way also the foam is mixed initially with the starch solution which has a marked strengthening effect upon the bubbles of the foam before such foam is mixed with the moistened gypsum. With the foam in this strengthened condition by the action of the cooked starch solution, the foam is capable of withstanding such pressure as is brought to bear upon it by its passage through a closed mixer of the type shown and described without any undue destruction of the bubbles.

I have found in practice that the mixture of ingredients as named is of marked uniformity as it escapes at 65. The bubbles are very small, are separated from each other, and are evenly distributed throughout the mixture. I have found that the strength and tenacity of the bubbles are such that the bubbles are maintained intact to at least a high degree during the application of pressure upon the body material in a board machine of the ordinary type. As a result of these conditions, and due primarily to the uniformity of the mixture of the materials, a light weight board is produced in which the desired bonding between the liners and the body is secured whereby comparatively high strength is attained in the board. These results are obtained by the use of greatly reduced proportions of excess water, serving to cut down materially the amount of water necessary to be evaporated out of the board and reducing materially the danger of calcination of the body material during the drying process.

It will be appreciated that the proportions of the several ingredients as stated above are illustrative of what I have found satisfactory. It will be appreciated also that under varying conditions and particularly when there are variations in the characteristics of the gypsum employed, it might be necessary to vary the proportions from the amounts above named if the best results and maximum efficiency are to be attained. My invention is accordingly not limited to the precise disclosure as stated, except so far as the claims may be so limited by the prior art.

I claim:

1. In the method of producing a product of the gypsum wall board type, that step which comprises the floating of pre-formed foam into a mixer with the other ingredients of the body material through the medium of at least a part of the water employed for the production of the plastic mixture.

2. In the method of producing a product of the gypsum wall board type, that step which comprises the floating of a pre-formed foam into a mixer with the other ingredients of the body material through the medium of an easily-flowing cooked carbohydrate solution.

3. In the method of producing a product of the gypsum wall board type, the steps which comprise feeding calcined gypsum into a rotary mixer, and feeding a pre-formed foam into said mixer at a different point and keeping it away from the gypsum until the latter has been moistened.

4. In the method of producing a product of the gypsum wall board type, the steps which comprise feeding calcined gypsum into a rotary mixer by which it is given an initial sidewise movement, and floating a pre-formed foam, through the medium of at least a part of the water employed for the production of the plastic mixture, into the mixer in such manner that the foam is kept away from the gypsum until the latter has been moistened.

5. In the method of producing a product of the gypsum wall board type, the steps which comprise feeding calcined gypsum into a rotary mixer by which it is given an initial sidewise movement, and floating a pre-formed foam into the mixer, through the medium of an easily-flowing cooked carbohydrate solution, and in such manner that the foam is given an initial sidewise movement in a plane different from that in which the gypsum is moved.

6. In the method of forming a product of the gypsum wall board type, the step comprising mixing measured quantities of preformed foam, calcined gypsum and water by the action of paddles rotating on a horizontal axis within a receptacle lying on its side and closed along the greater portion of its length.

7. In the method of forming a product of the gypsum wall board type, the steps which comprise floating measured quantities of preformed foam through the medium of easily-flowing cooked carbohydrate solution into one end of a receptacle lying on its side and closed along the greater portion of its length, and mixing said foam and solution in said receptacle with measured quantities of calcined gypsum by the action of rotating paddles located in close proximity to each other in such arrangement as to have a mutual cleaning effect on each other and so as to have a tendency to forward the materials through the receptacle.

8. In the method of producing a product of the gypsum wall board type, the steps which comprise feeding calcined gypsum into a rotary mixer on top of certain ones of a series of paddles rotating about a horizontal axis, feeding water into the mixer, and feeding pre-formed foam into the mixer on top of another of said paddles.

9. In the method of producing a product of the gypsum wall board type, the steps which comprise feeding calcined gypsum into a rotary mixer on top of certain ones of a series of paddles rotating about a horizontal axis, and floating pre-formed foam into the mixer on top of another of said paddles through the medium of at least a part of the water employed for the production of the plastic mixture.

10. In the method of producing a product of the gypsum wall board type, the steps which comprise feeding calcined gypsum into a rotary mixer on top of certain ones of a series of paddles rotating about a horizontal axis, and floating pre-formed foam into the mixer on top of another of said paddles through the medium of an easily-flowing cooked carbohydrate solution.

11. An apparatus for forming a product of the gypsum wall board type, comprising in combination a mixer, an inclined chute adapted to empty into said mixer, means for depositing measured quantities of foam into said chute, means for delivering a free-flowing liquid to said chute for floating said foam into said mixer, and means for feeding measured quantities of calcined gypsum into said mixer.

12. An apparatus for forming a product of the gypsum wall board type, comprising in combination a mixer having a series of paddles rotating about a horizontally disposed longitudinal axis, an inclined trough adapted to empty into said mixer on top of one of said paddles, means for depositing measured quantities of foam into said trough, means for delivering a free-flowing liquid to said trough for floating said foam into said mixer, and means for feeding measured quantities of calcined gypsum into said mixer on top of certain others of said paddles.

13. An apparatus for forming a product of the gypsum wall board type, comprising in combination a mixer having a series of paddles rotating about a horizontally disposed longitudinal axis, an inclined trough adapted to empty into said mixer, means for depositing measured quantities of foam into said trough, means for delivering a free-flowing liquid into said trough for floating said foam into said mixer, baffle plate means for directing the foam and liquid from the trough into position on top of one of the paddles, and means for feeding measured quantities of calcined gypsum into said mixer on top of certain others of said paddles.

WILLIAM K. NELSON.

CERTIFICATE OF CORRECTION.

Patent No. 1,868,671.                                                               July 26, 1932.

WILLIAM K NELSON.

It is hereby certified that error appears in the printed specification of the above numbered patent requiring correction as follows: Page 3, line 2, strike out the words "roller 44, and with the rate of deposit of" and insert instead closed receptacle resting on its side,; and that the said Letters Patent should be read with this correction therein that the same may conform to the record of the case in the Patent Office.

Signed and sealed this 22nd day of November, A. D. 1932.

M. J. Moore,
(Seal)                                                     Acting Commissioner of Patents.